W. F. COCHRANE.
Mower.

No. 60,692.

Patented Jan. 1, 1867.

Witnesses:

Inventor:

United States Patent Office.

WILLIAM F. COCHRANE, OF SPRINGFIELD, OHIO.

Letters Patent No. 60,692, dated January 1, 1867.

---

IMPROVEMENT IN HARVESTERS.

---

The Schedule referred to in these Letters Patent and making part of the same.

---

TO ALL WHOM IT MAY CONCERN:

Be it known that I, WILLIAM F. COCHRANE, of Springfield, in the county of Clark, and State of Ohio, have invented certain new and useful improvements in Harvesting Machines, of which the following is a full, clear, and exact description, reference being had to the accompanying drawing, making part of the same, in which—

Figure 1:
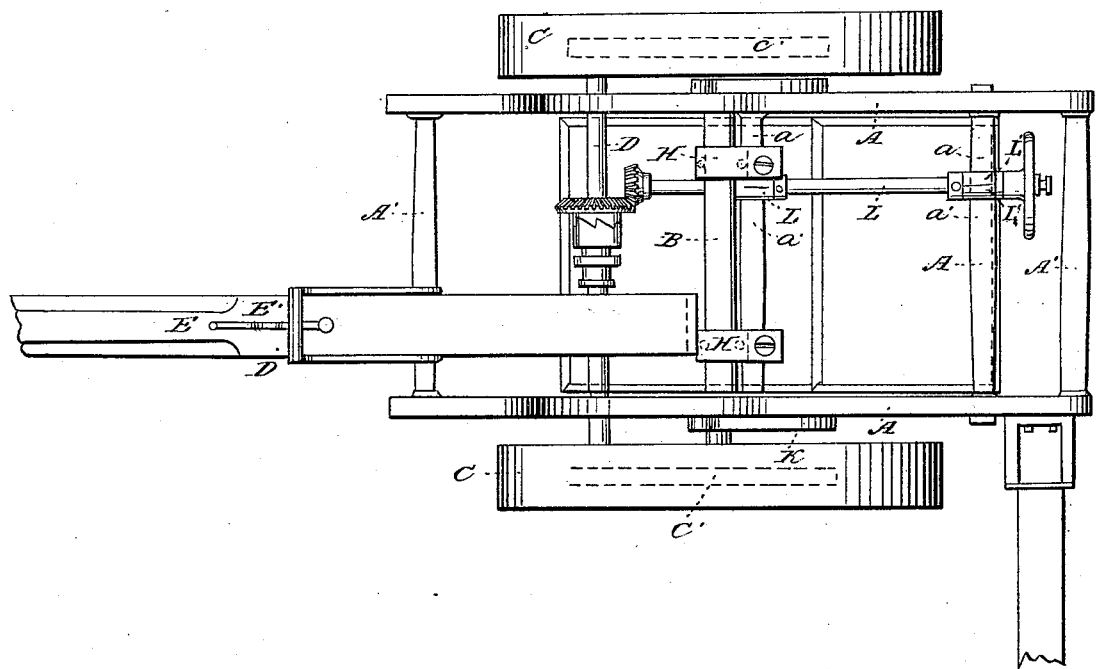
Figure 2:
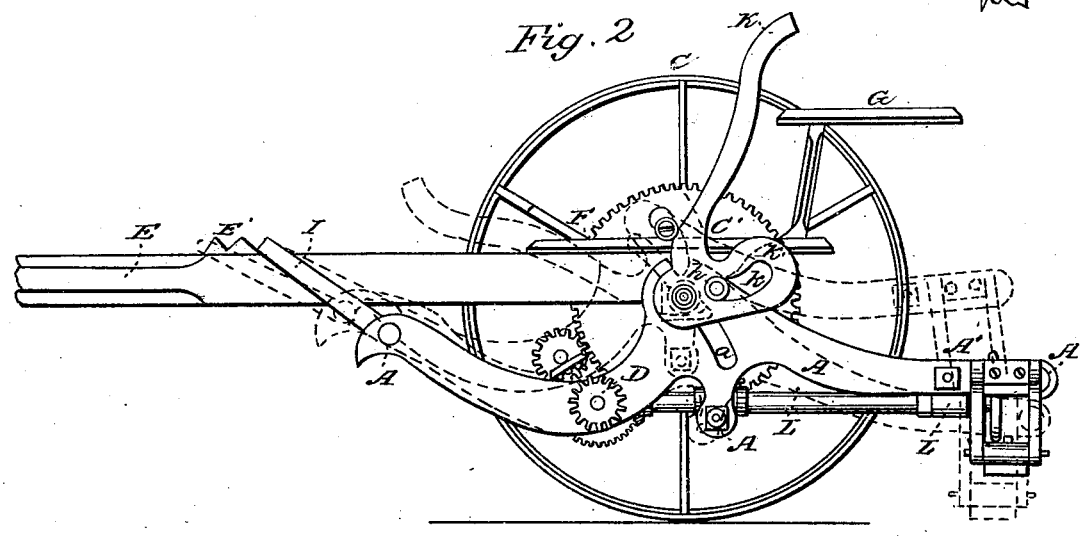

Figure 1 is a plan or top view of a machine illustrating my improvements, the position of the driver's seat and foot-board being shown in red lines; and Figure 2 is a side elevation of the same.

Similar letters of reference indicate corresponding parts in the two figures.

My invention consists in a novel construction of the main frame of the machine; in the arrangement of said frame in relation to the main axle and driving-wheels; in the employment of the main axle as a rock-shaft, through which, by means of suitable lever arrangement, the frame may be raised up and let down on the axle, guided in its movements by segmental slots formed in the frame, and in a novel device for holding the frame when the cutters are adjusted to the desired height, as hereinafter explained.

In the accompanying drawing, A A' represent a main frame, composed of side pieces A and transverse axle pieces or girders A', by which the side pieces are held at the desired distance apart, and to the ends of which the side pieces are bolted by means of long bolts passing through the side pieces and through the girders made tubular for that purpose. The side pieces are of an irregular form, and are expanded at any convenient or desired point in their length, in the manner shown in the drawing, to admit of segmental slots a being formed in them of a suitable width to receive the ends of the axle B, the frame pieces being passed over the ends of said axle and made to abut against shoulders formed by the enlargement of that portion of the axle which is between the frame-pieces A, making a hub of a length equal or nearly equal to the length of the tubular girders, thereby preventing lateral movement of the frame on the axle, and assisting in properly bracing and strengthening the frame at that point. Instead of this hub or enlarged central portion, adjustable collars, answering the same purpose, may be used. C C are the main driving and supporting-wheels, mounted on the opposite ends of axle B, outside of frame A, in such manner as to revolve freely and independently of each other on said axle. Said wheels are provided with spur-wheels C', which mesh with and drive pinions D' on counter shaft D, from which motion may be communicated to the cutters in the usual manner. E is the pole or tongue by which the machine is drawn, which is connected by its rear end to the pole-plate or frame F, which also forms the foot-support for the driver mounted on seat G. The plate or frame F is supported on standards H, which embrace and are free to turn on the axle B. I is a stirrup, attached to the forward transverse pillar of frame A in such manner as to be free to turn thereon. The upper or swinging end of said stirrup is made to embrace the pole or tongue E, which is provided with a toothed rack, E', with the teeth of which the yoke or stirrup engages for the purpose of holding the frame when the latter is adjusted to give the desired elevation to the cutters, in a manner hereinafter explained. K is a bent lever, secured to the axle B in such manner as will admit of its being adjusted thereon to bring it into convenient position to be operated by the driver on his seat, and in such manner, also, as will cause the axle to turn with the lever and operate as a rock-shaft, as hereinafter explained. The short, bent arm K' of the lever K has an elongated slot k, of curved form, (or any other form that will answer the purpose,) to receive a pin, k', provided with a friction-roller, secured to the frame A. K'' is an arm, corresponding in form and construction, and in its relation to the axle and main frame, with the arm K', and attached to the axle on the opposite side of the frame in such manner as to turn with the axle when operated by lever K, and to operate on the opposite side of the frame in the same manner as said lever through its arm k' operates upon its side of the frame, and thereby, through the axle, both sides of the frame are acted upon simultaneously, and said frame is caused to slide bodily up and down on the axle, guided in its movements by the segmental slots formed in the side pieces. L is the crank-shaft, mounted in bearings in divided chilled boxes L', which are supported upon the through-bolts, which secure the side pieces of the frame in place. The tubular girders on the bolts, to which said boxes are connected, are also divided at a suitable point to receive said boxes, and the parts or ends being tightly drawn against the sides of the divided boxes by the tightening of the bolt, the boxes are held securely in place. By loosening the bolts sufficiently to allow the parts of the divided box to be separated far enough to allow of the passage of the crank-shaft between them the crank-shaft may be readily removed and another substituted in its place. The crank-shaft is operated from the counter-shaft by suitable bevel-wheel and pinion, as shown by the drawing. The side pieces of the frame may be cast in one piece, with the segmental slots formed in them, and in the form shown, or they may be cut or stamped out of plates of rolled metal by means of suitable dies for that purpose; and the lever K and arm K″ may be made in the same manner. The slots in the frame are made to centre in the frame pieces, and are in the arc of a circle centering in the counter-shaft, which has its bearings in said frame-pieces, as shown in the drawing. By the construction hereinabove described it will be seen that by operating lever K the axle turns with it, operating as a rock-shaft, and causes the arms K′ K″ to act simultaneously upon the opposite sides of the frame in the manner explained, thereby sliding the frame up and down on the axle as the lever is moved back and forth, the frame being guided in its movements on the axle by the segmental slots $a$. These slots being made in the arc of a circle, of which the counter-shaft is the centre, if the frame, in which said counter-shaft has its bearings, were fixed at that point, the movement of the vibrating rear end, to which the cutting apparatus is attached in this instance, would be merely in the arc of a circle around said shaft; but, the frame being extended forward of said shaft and connected to the tongue of the machine by the adjusting-stirrup in the manner explained, and the forward, extended end of the frame being held up against the tongue by the weight of the cutting apparatus at its rear end and by said stirrup, the frame, in being adjusted, is caused to move bodily; the rear end, with the cutters attached, rising and falling in the arc of a circle and the forward end reciprocating back and forth under the tongue. When the frame is raised the stirrup or yoke connected to the forward sliding end of the frame passes over the teeth of said rack E′ until the desired elevation of the cutters is obtained, when the yoke engages with the rack and prevents any backward movement of the forward end of the frame, and consequently any downward movement of the cutters and rear end of the frame. When it is desired to lower the cutting apparatus the driver, with his foot, or by any suitable appliance for the purpose, disengages the stirrup from the rack, reverses the movement of the lever, and causes the frame to move backward and downward on the axle until the cutting apparatus is depressed to the desired point, or rests upon the ground when the machine is to be used for mowing, in which position the rear end of the frame is free to rise and fall independently of the vertical movements or vibrations of the tongue or main axle, to conform to the surface of the ground over which it is drawn. When, however, the frame is in its elevated position, for reaping, the axle rests in the bottom of the slots, preventing further upward movement of the frame; and the forward end thereof being firmly locked to the tongue by the stirrup and rack, any backward or downward movement of said frame is prevented, and the machine becomes, for all practical purposes, a rigid frame and stiff-tongue machine, the vertical movements or vibrations of the tongue and axle controlling the vertical movements of the cutting apparatus. By simply turning the tongue and plate F around, reversing their relation to the frame, and changing the cutting apparatus, or adapting the frame to receive the same cutting apparatus on its opposite side, the machine may be converted from a rear to a front-cut machine. The stirrup may be operated by a rack located upon a rear extension of the tongue, or an arm attached to the seat and tongue-frame. The other changes that would be necessary will be obvious.

What I claim, and desire to secure by Letters Patent, is—

The side pieces of the frame, with the segmental slots formed in them, made in one piece, substantially as described.

I also claim the segmentally-slotted frame, arranged between the wheels, and in combination with the main axle of the machine, substantially as described.

I also claim the employment of the main axle as a rock-shaft, in combination with the segmentally-slotted frame sliding up and down on said axle, substantially as described.

I also claim the slotted lever K, or its equivalent, connected to and operating the main axle and frame of the machine, substantially as described.

I also claim the combination of the slotted lever and adjusting-stirrup with the segmentally-slotted frame, substantially as described.

I also claim the adjusting-stirrup in combination with a toothed rack and a segmentally-slotted frame for locking the said frame when the cutting apparatus is adjusted to the desired height, substantially as described.

I also claim the divided boxes or bearings for the crank-shaft, in combination with the divided tubular transverse pieces or girders, and the through bolts or their equivalent, substantially as described.

WM. F. COCHRANE.

Witnesses:
  N. B. SMITH,
  EDM. F. BROWN.